Nov. 3, 1970   R. M. HOWE   3,538,319
ELECTRONIC FUNCTION GENERATION AND MULTIPLICATION
Filed March 20, 1968   8 Sheets-Sheet 6

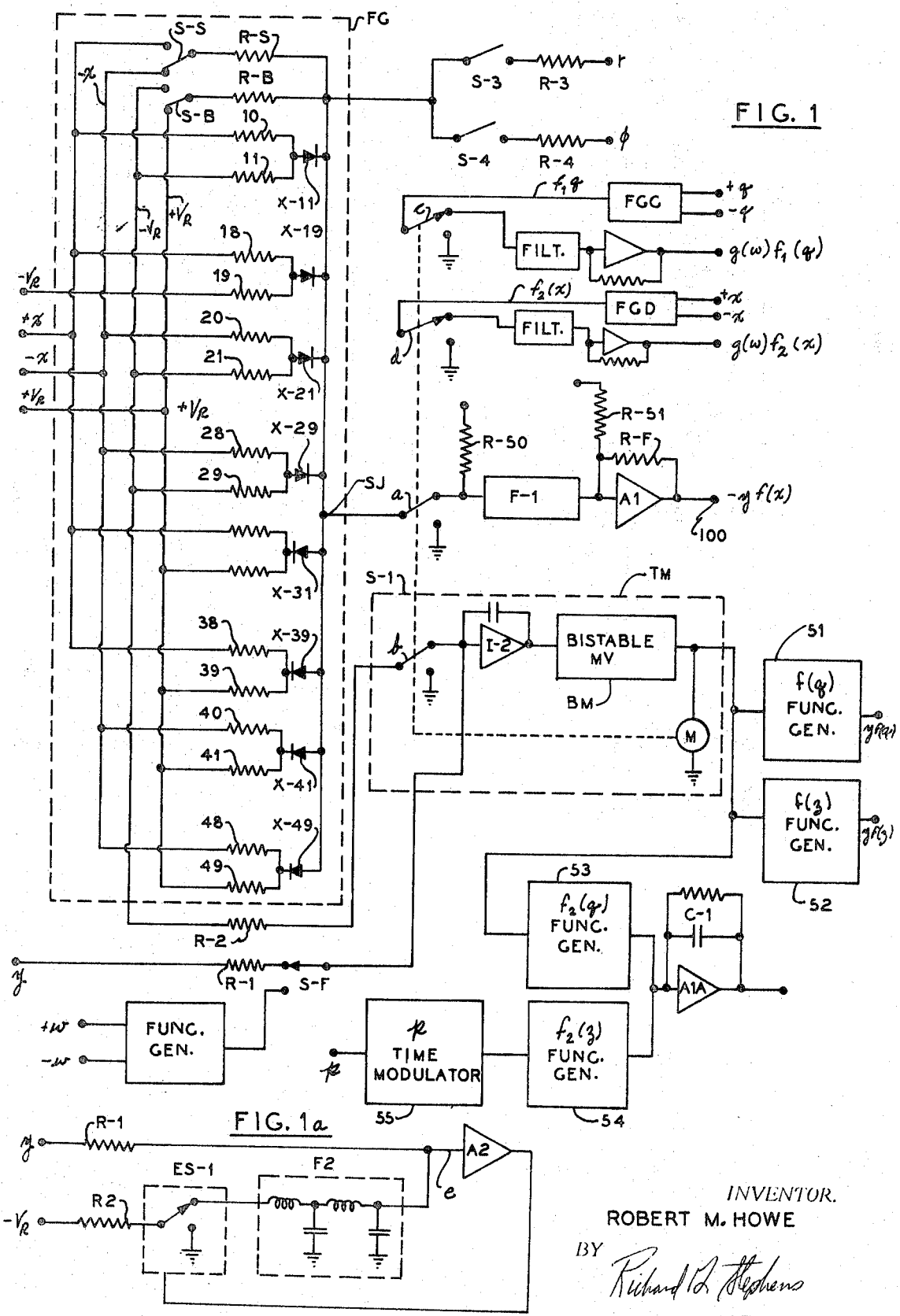

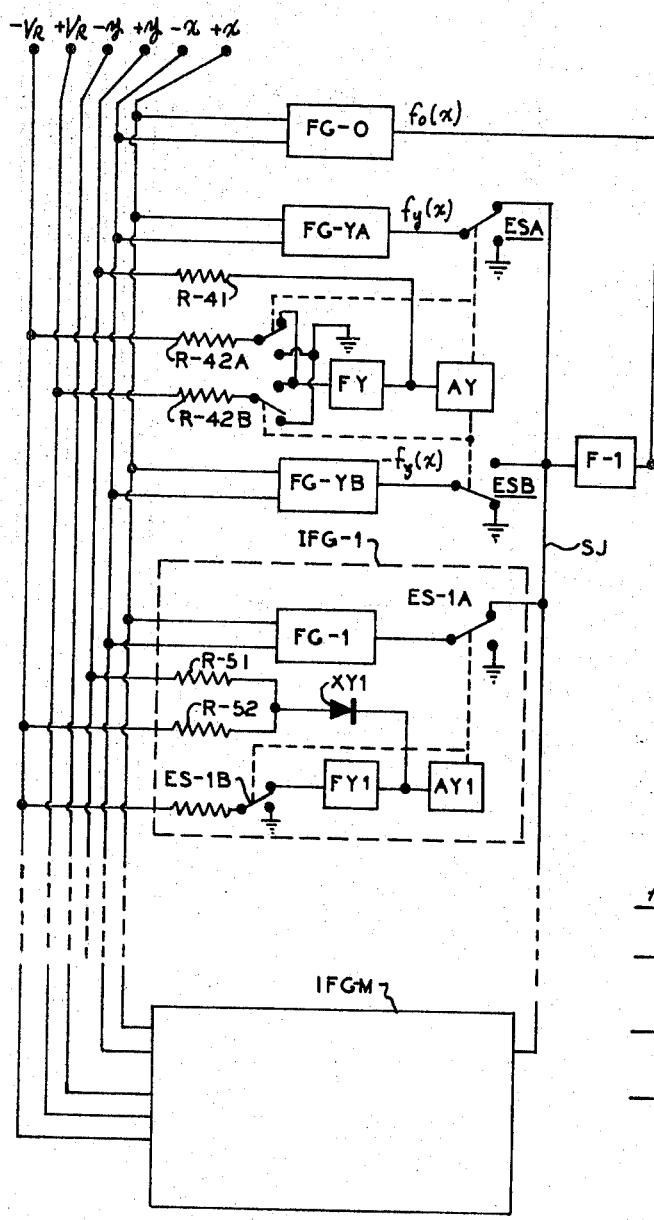

INVENTOR.
ROBERT M. HOWE
BY Richard L. Stephens
ATTORNEY

INVENTOR.
ROBERT M. HOWE

Nov. 3, 1970 R. M. HOWE 3,538,319
ELECTRONIC FUNCTION GENERATION AND MULTIPLICATION
Filed March 20, 1968 8 Sheets-Sheet 8

INVENTOR.
ROBERT M. HOWE
BY Richard J. Stephens
ATTORNEY

United States Patent Office 3,538,319
Patented Nov. 3, 1970

3,538,319
ELECTRONIC FUNCTION GENERATION
AND MULTIPLICATION
Robert M. Howe, Villars-sur-Ollon, Switzerland, assignor to Applied Dynamics, Inc., Ann Arbor, Mich., a corporation of Michigan
Filed Mar. 20, 1968, Ser. No. 719,290
Int. Cl. G06g 7/16, 7/26
U.S. Cl. 235—194
45 Claims

ABSTRACT OF THE DISCLOSURE

Provision of economical all-electronic multiplying function generator apparatus by time-modulating a diode function generator output current or other function generator output in accordance with a multiplier variable and then filtering and amplifying the modulated current, the use of a plurality of such multiplying function generators to electronically generate functions of two, three and more variables and trigonometric functions, and the use of such devices to provide signals for driving synchro and like devices.

---

In solving non-linear differential equations, such as those commonly used for aircraft and missile control and flight simulation, a frequency arising requirement is that of non-linear function generation followed by multiplication, such as, for example, the generation of a quantity commensurate with coefficient of lift $C_L$, which depends largely upon wing shape, multiplied by dynamic pressure quantity $q$, to provide a lift force quantity L. The present invention involves an analog arrangement for providing both non-linear function generation and multiplication electronically, using extremely simple, reliable and inexpensive circuitry. No operational amplifiers are required for the actual computation, and extremely high accuracy is attainable.

For many years the principal device for accomplishing both analog function generation and multiplication has been the servo-driven non-linear potentiometer. By applying a voltage V across the potentiometer winding, positioning the potentiometer wiper arm to a position commensurate with a voltage $x$ by means of a servo-mechanism, and by tailoring the position-resistance characteristic of the potentiometer in accordance with a desired function $f(x)$, the wiper arm output has been made to represent the desired function $Vf(x)$. The non-linear resistance vs. wiper arm displacement characteristic of the potentiometer commonly has been achieved either by use of a special non-uniform width potentiometer winding card, or by using a multi-tapped potentiometer with bias voltages or resistors connected to the taps to achieve the desired non-linear characteristic. Such a servo-positioned arrangement has been disadvantageous, not only because of cost and because of the dynamic limitations of the servomechanism, but also because the mechanical arrangement has required considerable maintenance and the potentiometer resolution sometimes has been limited.

More recent equipment involving analog function generation followed by multiplication commonly have involved biased diode circuits to represent a straight-line approximation to the function $f(x)$, first followed by an operational amplifier to convert the resulting current to a voltage, and then further followed by an all-electronic multiplier, usually the well-known diode "quarter-squares" multiplier. In order to drive a conventional "quarter-squares" multiplier, both polarities of both of the input voltages to the multiplier have been required, in order to provide an output current $Vf(x)$ from the multiplier of a type which can be terminated in an operational amplifier. The chief disadvantages of such a prior art scheme have been its cost and complexity, with a minimum of two extra operational amplifiers being required for each function $f(x)$. The primary object of the present invention is to provide simple and economical apparatus which overcomes the above-mentioned disadvantages of the prior art. Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which FIG. 1 is an electronic schematic diagram illustrating the principles of one form of multiplying function generator in accordance with the invention;

FIGS. 1a, 1b, 1c and 1d are each schematic diagrams useful in understanding the operation of various forms of time-modulator means which may be used with the invention;

Figure 3:
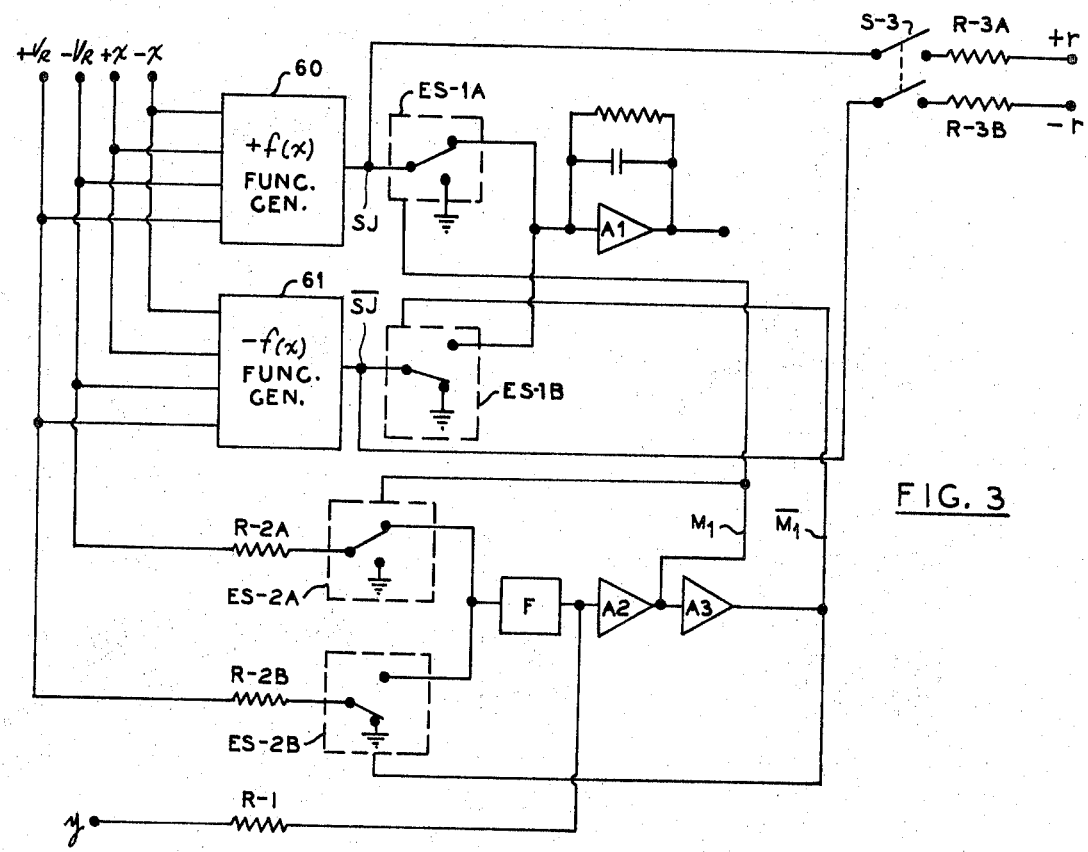

FIG. 3 schematically illustrates an alternative form of multiplying function generator in which either or both the non-linear function and the variable by which it is multiplied by may be either positive or negative.

FIG. 4 schematically illustrates one manner in which a plurality of a multiplying function generator may be combined to electronically generate a function of two variables.

FIG. 4a illustrates a manner in which a portion of FIG. 4 may be modified to multiply the two-variable function by a third variable.

Figures 4B, 5:
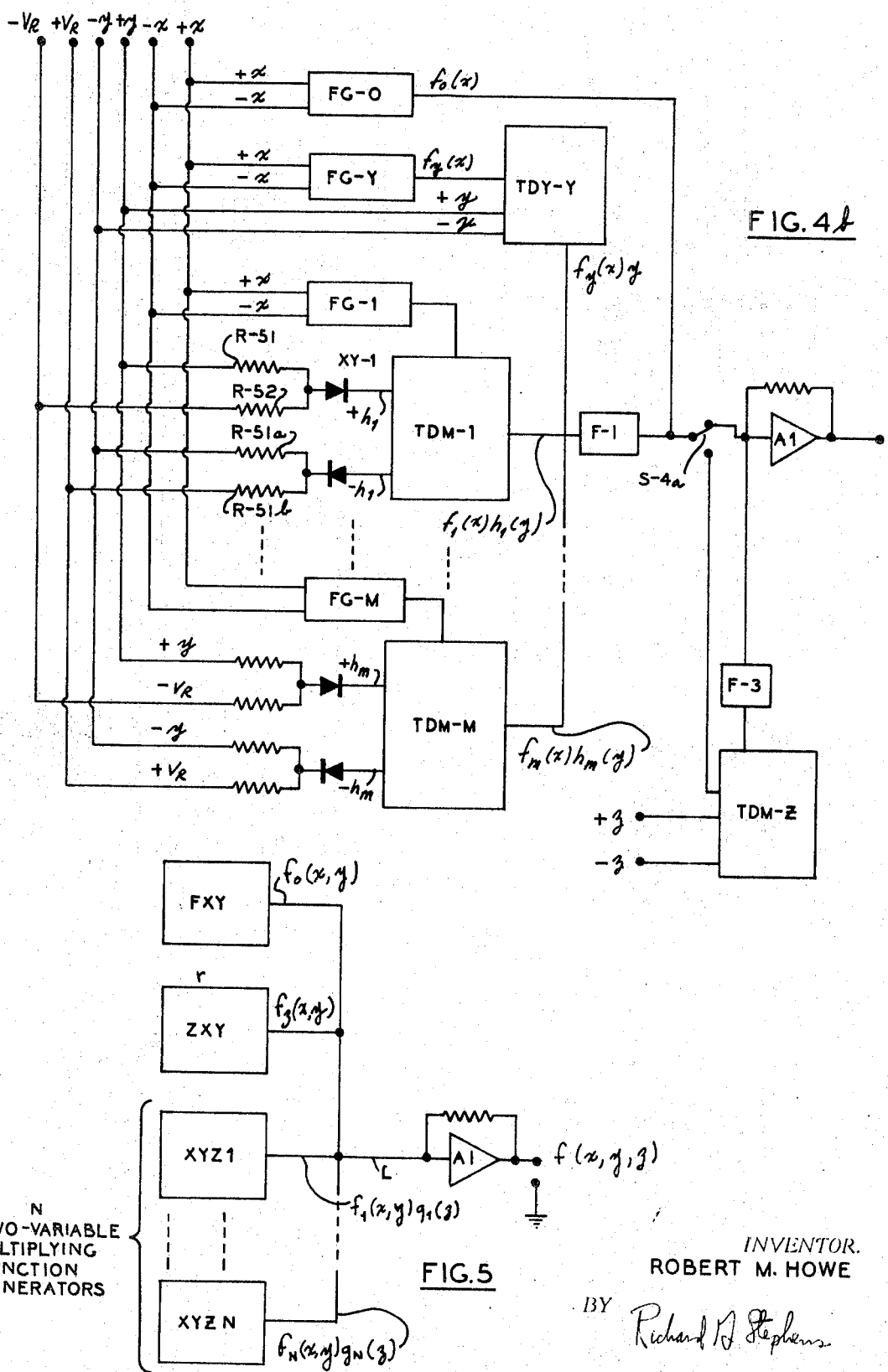

FIG. 4b schematically illustrates an alternative manner in which a plurality of multiplying function generators of the invention may be interconnected to electronically generate a function of two variables.

FIG. 5 illustrates how a plurality of two-variables function generators may be combined to generate a function of three variables.

Figure 6:
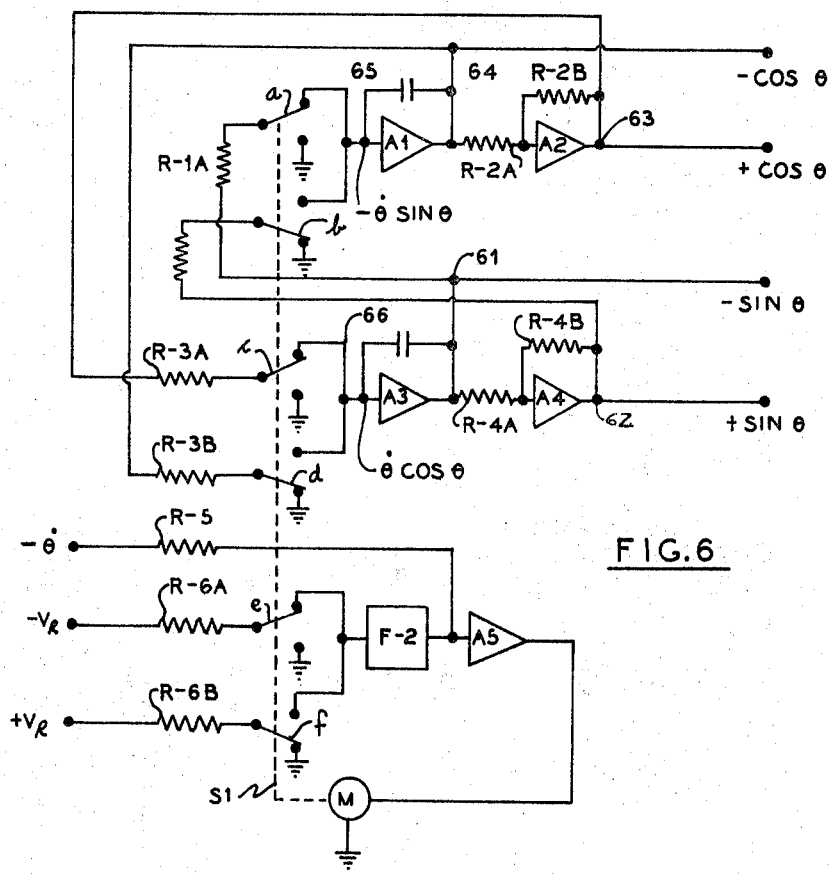

FIG. 6 is an electrical schematic diagram illustrating the use of time-modulation multiplication of non-linear functions to generate sine and cosine function potentials.

Figure 6A:
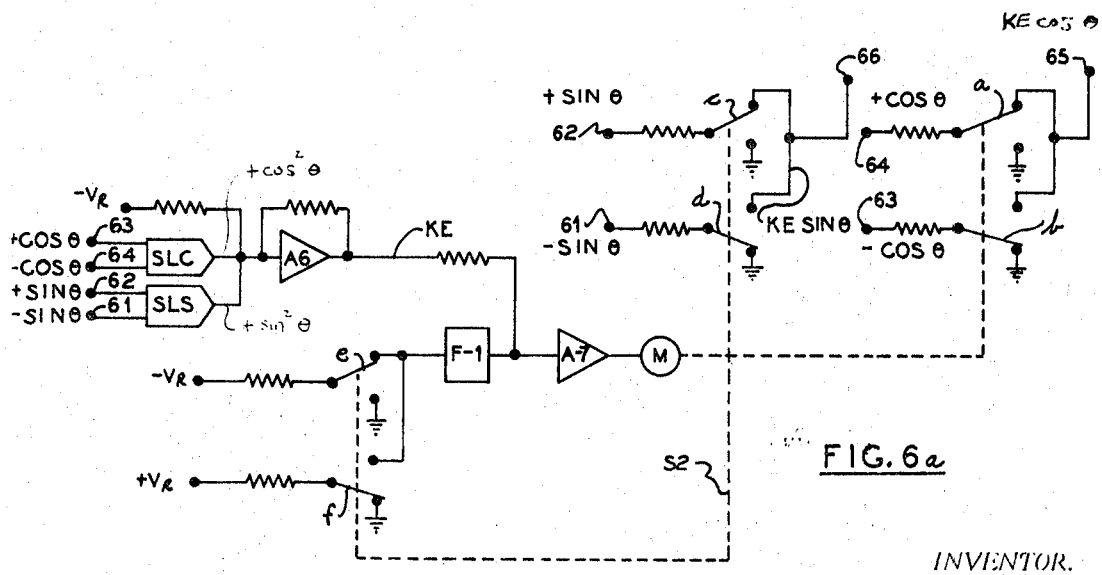

FIG. 6a illustrates further apparatus which may be added to the circuit of FIG. 6 to compensate or correct for errors which otherwise might occur due to drift or minor scaling errors.

Figure 7:
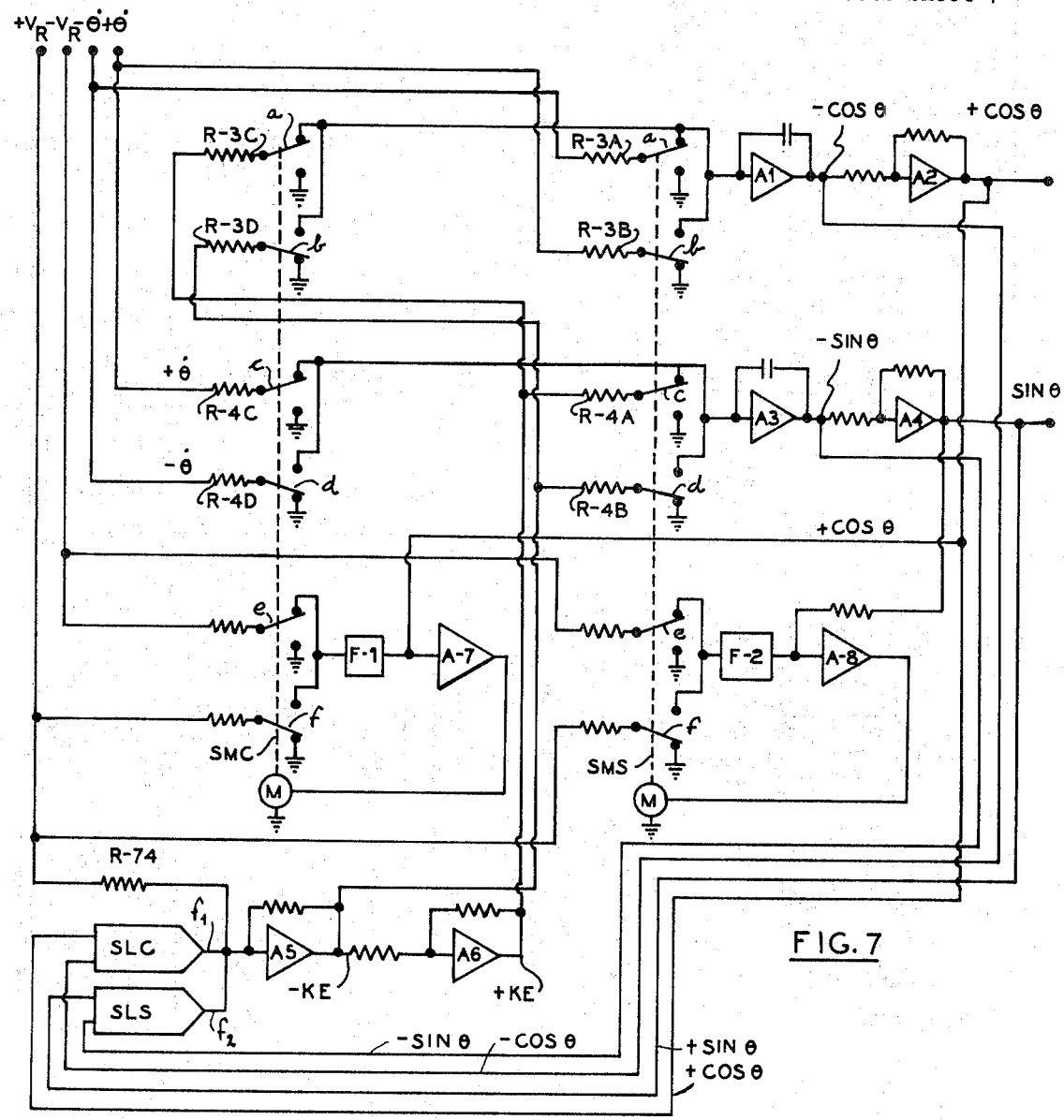

FIG. 7 is an electrical schematic diagram illustrating an alternative form of a trigonometric function generator.

Figure 8:
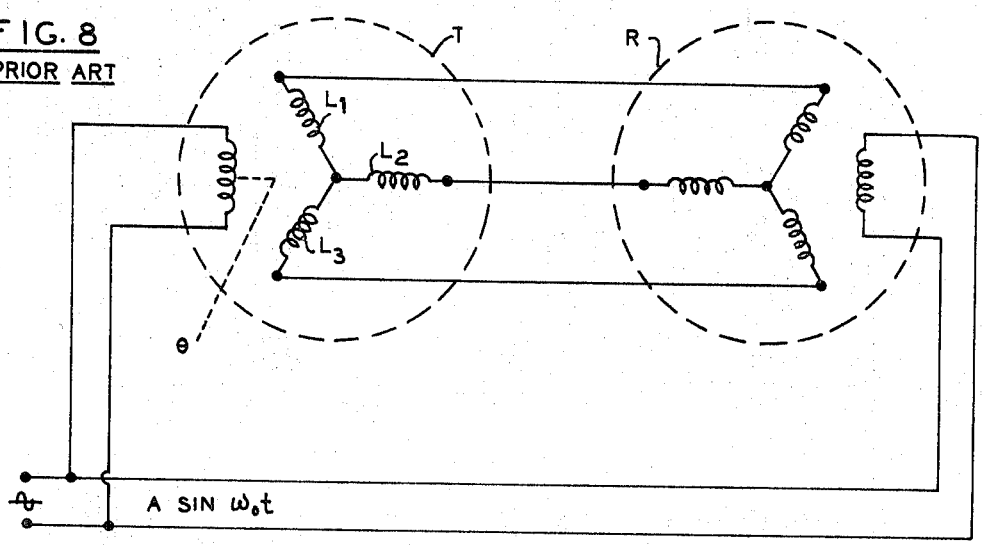

FIG. 8 is an elementary schematic diagram illustrating the well-known connections between conventional synchro or selsyn transmitters and receivers.

Figure 9B:
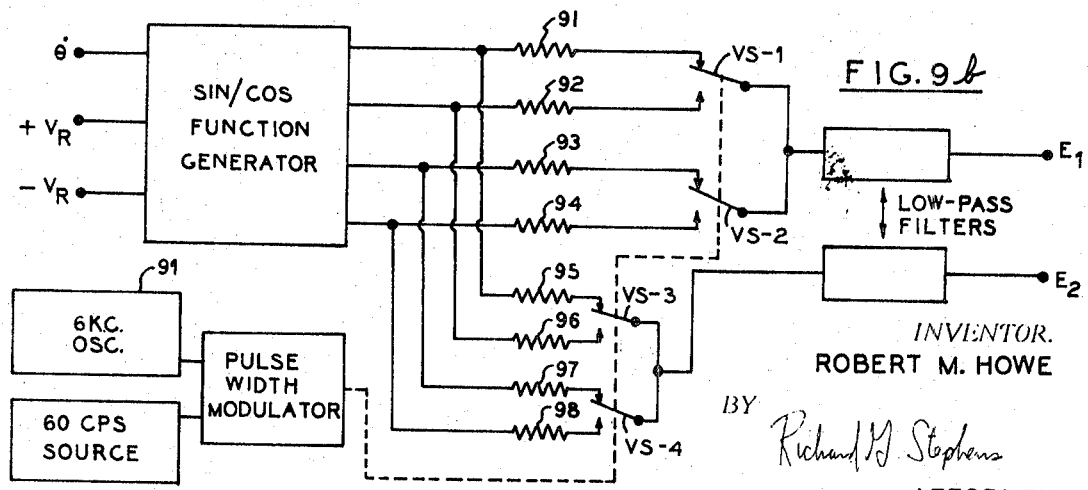
Figure 9:
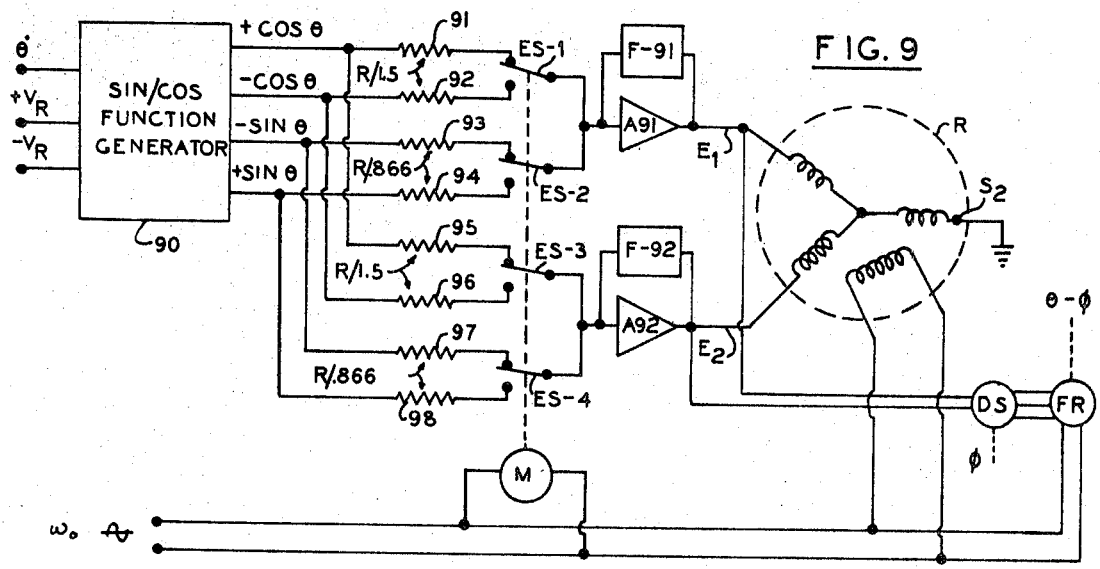

FIG. 9 is an electrical schematic diagram illustrating how the output signals from a direct-current trigonometric function generator (such as that of FIG. 6 or that of FIG. 7) may be suitably modulated to drive a conventional synchro or selsyn receiver, or like device.

Figure 9A:
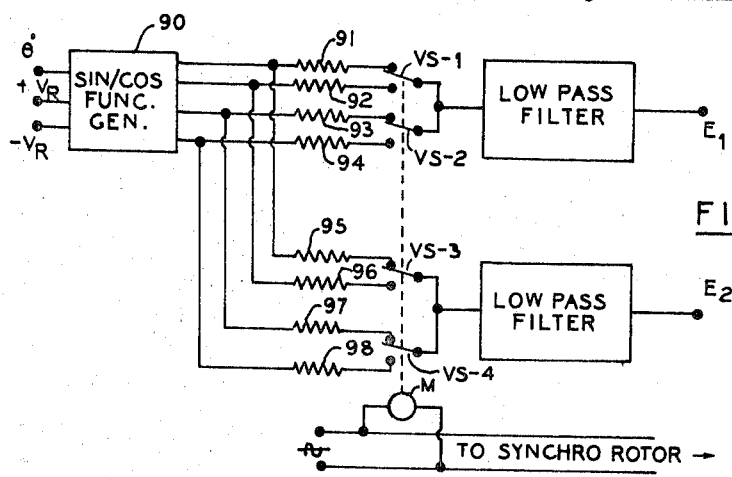

FIG. 9a illustrates a modified form of the circuit of FIG. 9, and FIG. 9b illustrates a further modified form of the circuit of FIG. 9.

Figure 2:
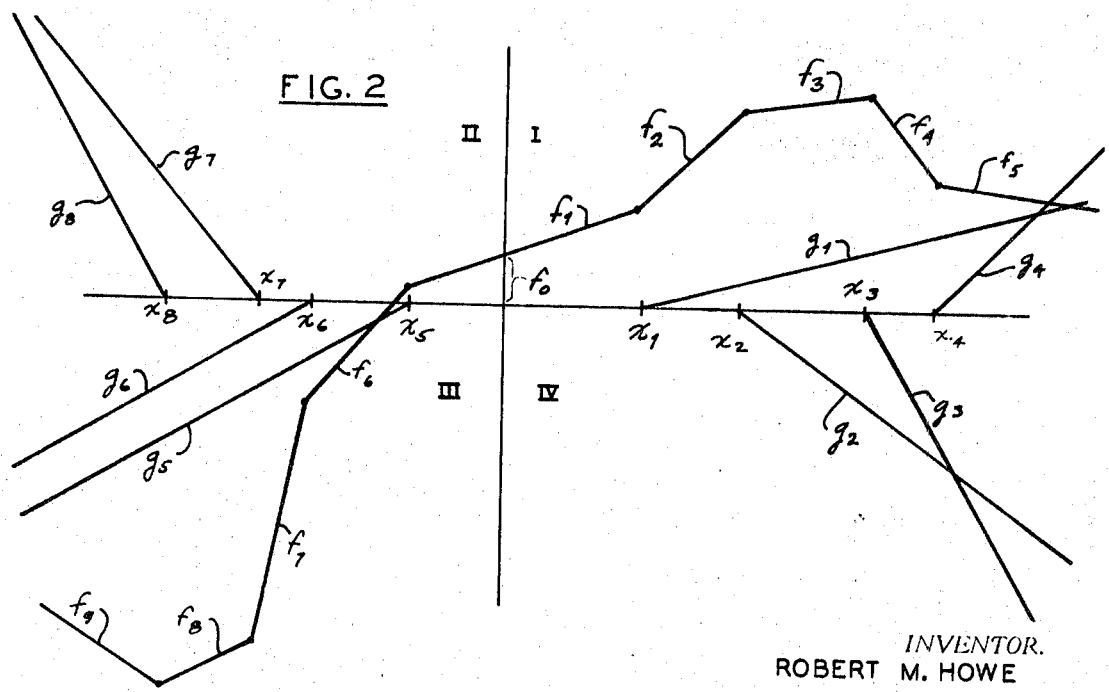
FIG. 2 is a plot of a multi-segment straight-line approximation to an arbitrary non-linear function of one variable, together with plots of linear incremental functions which may be combined to produce the multisegment approximation.

In FIG. 2 a non-linear function $f(x)$ is shown approximated by nine straight-line segments $f_1$ through $f_9$, and a parallax or bias term $f_0$. The straight-line segments are generated by summing together in an operational amplifier, the bias term $f_0$, a central slope current $f_1$, and appropriate ones of a group of slope incremental functions $g_1$ through $g_8$. In FIG. 2 two slope incremental functions are shown in each of the four quadrants I through IV. In many applications the functions to be generated will require different numbers of slope incremental functions in the different quadrants, and some applications, of course, will not require operation throughout all four quadrants.

A central concept of the present invention involves the combination of a diode function generator and a time-division multiplier into a single passive computing element. In the device of FIG. 1 a pair of resistors and a diode are provided to generate each of the slope incremental functions. Resistors 10 and 11 and diode X–11 generate the $g_1$ function, and resistors 18, 19 and diode X–19 generate the $g_4$ function, both of which functions lie in quadrant I. Resistors 10 and 18 are connected to receive a $+x$ input voltage, and resistors 11 and 19 are connected to receive the negative reference voltage, $-V_R$. Resistors 20, 21 and diode X–21 generate the $g_7$ function and resistors 28, 29 and diode X–29 generate the $g_8$ function, both of which functions lie in quadrant II. Resistors 20 and 28 are connected to receive the $-x$ input voltage, and resistors 21 and 29 are connected to receive the negative reference voltage, $-V_R$. Resistors 30, 31 and diode X–31, and resistors 38, 39 and diode X–39 generate the $g_5$ and $g_6$ functions of quadrant III. Resistors 30 and 38 are connected to receive the $+x$ input voltage, and resistors 31 and 39 are connected to receive the positive reference voltage, $+V_R$. Resistors 40, 41, diode X–41 and resistors 48, 49 and diode X–49 generate the $g_2$ and $g_3$ functions of quadrant IV. Resistors 40 and 48 are connected to receive the $-x$ input voltage, and resistors 41 and 49 are connected to receive the positive reference voltage, $+V_R$. The slope incremental functions $g_1$ through $g_8$ are made to occur at breakpoint values $x_1$ through $x_8$ by selection of the resistance ratios between the two resistors associated with each slope incremental function. The resistors may be made variable to allow variable breakpoints to be selected. Resistor R–B, which is connected to a reference voltage source, provides the bias voltage $f_0$ and resistance R–S, which is connected to an $x$ input voltage source, generates the central-slope function $f_1$. Bias resistance R–B and central-slope resistor R–S are connected through respective reversing switches S–B and S–S to allow the bias term and central-slope to be either positive or negative. In certain applications where operation through less than all four quadrants is required, only one polarity of the input variable $x$, and/or the reference voltage $V_R$ is required, and in various applications the bias and/or central slope inputs may not be required. Bias resistor R–B, central-slope resistance R–S and all of the slope incremental function circuits connect to summing terminal SJ, thereby providing a current at terminal SJ commensurate with the straight-line approximation to the desired function $f(x)$. The basic function generator circuit embraced within dashed lines at FG in FIG. 1 is know in the art, but with terminal SJ connected directly to the summing junction of a first operational amplifier, and where multiplication of the non-linear function by another variable has been desired, the output of the first operational amplifier usually has been inverted by a second operational amplifier, in order to provide both $+f(x)$ and $-f(x)$ voltages to drive a succeeding quarter-squares multiplier or other type of multiplier.

In accordance with the present invention, summing terminal SJ is connected instead through an electronic switch S–1a, which is shown in FIG. 1 as a simple mechanical switch for sake of simplicity, to a low-pass filter and then to the summing junction of operational amplifier A1. Switch S–1a and a similar switch S–1b, are opened and closed periodically with a duty-cycle which is proportional to input voltage $y$, and the average current which is passed through filter F–1 provides an output voltage $-yf(x)$ at the output terminal 100 of amplifier A1.

The switch-controlling voltage is generated with a duty cycle proportional to input voltage $y$ by means of a time-modulation circuit shown within dashed lines at TM in FIG. 1. In practice time-modulation circuit TM may comprise any one of a number of well-known time-modulation or pulse-with modulation circuits, a number of which are described at pages 146–168 of my book "Design Fundamentals of Analog Computer Components," D. VanNostrand Company, Inc., New York (1961) and at pages 7–10 to 7–12 of "Electronic Analog and Hybrid Computers" by Korn and Korn, McGraw-Hill, New York, 1964. Time-modulation circuits used with the present invention may be either the self-excited variable repetition frequency type or the externally-excited fixed repetition frequency type, for example. The illustrative circuit schematically illustrated at TM in FIG. 1 is of the self-excited variable repetition frequency type.

The negative reference voltage $-V_R$ is applied via resistor R–2 to switch S–1b, and the position or condition of switch S–1b is controlled by the output signal of bi-stable multivibrator circuit BM. During one multivibrator output state, polarity-sensitive relay coil M translates switch S–1b to the position shown in FIG 1, thereby applying a negative reference current input to integrator I–2. During the other state of multivibrator BM, switch S–1b is grounded. The state of multivibrator BM is controlled by the level of the output voltage from integrator I–2, so that the multivibrator switches into one state when the integrator output reaches a predetermined upper triggering level and switches into the opposite state when the integrator output reaches a predetermined lower triggering level. The $y$ variable input voltage continuously applies an input current to integrator I–2 via resistor R–1. Resistor R–2 is smaller than resistor R–1.

Assuming that switch S–1b is grounded during a time $T_1$ so that only the positive $y$ input current is applied to integrator I–2, it will be seen that the integrator I–2 output voltage will ramp downwardly, with a slope directly proportional to the $y$ input voltage and inversely proportional to resistance R1. When the integrator I–2 output voltage reaches the lower triggering level of multivibrator BM, switching of the multivibrator will transfer switch S–1b, so that the negative reference current $(-V_R/R_2)$ will be applied as a second input current to integrator I–2. During time $T_2$ integrator I–2 integrates the resultant input current $(y/R_1-V_R/R_2)$, thereby providing a positive-going or upward ramp output voltage from integrator I–2, and it will be seen that time period $T_2$ will last until the integrator output reaches the multivibrator BM upper triggering level, at which time the switching of multivibrator BM and switch S–1b will begin a new cycle. If the $y$ input voltage, which must always be positive, increases in magnitude, it will be seen that the downward ramp produced during time $T_1$ will be proportionally steeper, taking less time to reach the lower triggering level, and that the upward ramp produced during time $T_2$ will be proportionally less steep. Conversely, as the $y$ input voltage is increased in magnitude, it will be seen that the downward ramp occurring during time $T_1$ will be less steep and that the upward ramp occurring during time $T_2$ will be more steep. As the $y$ variable input voltage approaches zero, the time $T_2$ period will be seen to involve an almost flat, very slightly downward ramp, and the time $T_2$ period will be seen to involve a very steep and very brief upward ramp. With linear ramp voltages it will be seen that the duration of the time $T_2$ periods will be linearly and directly proportional to the value of the $y$ input voltage. The output voltage from multivibrator BM is connected to control switch S–1a in the same manner that it controls switch S–1b, thereby modulating the current at terminal SJ in accordance with the variable $y$, and thereby providing a time-average output voltage from amplifier A–1 commensurate with $yf(x)$. In most embodiments of the invention switches S–1$a$ and S–1$b$ will comprise transistor switches (or other electronic switches) controlled directly by the multivibrator output voltages. The multivibrator output waveforms with the duty-cycle proportional to $y$ also can be used to drive further function generator circuits, such as those shown in block form at 51 and 52 to produce $-yf(q)$ and $-yf(z)$, etc., where circuits 51 and 52 each comprise a diode function generator, filter and amplifier corresponding to those shown for $-yf(x)$ in FIG. 1 and include switching means similar to S–1$b$. Also, in many applications a single operational amplifier may be used to add the outputs from a plurality of switches or the outputs from a plurality of filters, and also to sum other inputs. In FIG. 1 resistors R–50 and R–51 are intended to illustrate the summing in of further input signals. In FIG 1 blocks 53 and 54 are each intended to represent a diode function generator followed by a switch. The switch of the $f_2(q)$ generator 53 is controlled by the $y$ time-modulation circuit output of multivibrator BM to multiply the $f_2(q)$ function by $y$, and the $f_2(z)$ function generator 54 is controlled by a similar time-modulator circuit 55 to multiply the $f_2(z)$ function by a different variable $p$. The output waveforms from the two switches are applied together as inputs to operational amplifier A1A. The use of a feedback capacitor around amplifier A1A eliminates the need for any filters corresponding to filter F–1. The output from amplifier A1A will be seen to equal $-[yf_2(q)+pf_2(z)]$. Use of a feedback capacitor in parallel with resistor R–F similarly will allow filter F–1 to be eliminated. In applications where $-yf(x)$ is to be integrated, it will be apparent that feedback resistor R–F may be eliminated.

A simplified alternative form of time-modulator circuit which may be substituted for circuit TM of FIG. 1 is shown in FIG. 1$a$, and its operation may be readily understood by comparison with that previously described for circuit TM. In FIG. 1$a$ the negative reference potential is applied via resistor R2 and electronic switch ES–1 to low-pass filter F2, and the output of filter F2 and the $y$-variable input current through R1 are applied together to amplifier A–2. Amplifier A2 may comprise an open-loop saturating amplifier, which swings between a high positive output voltage and a large negative output voltage whenever its input current swings from a slightly negative value to a slightly positive value. Assuming initially that switch ES–1 is grounded, it will be seen that the net input current to amplifier A2 will be positive, providing a negative output voltage from amplifier A2, which will close switch ES–1. Closure of switch ES–1 causes first a discharging of the positive voltage theretofore applied to its right-hand sections and then charging of filter F2 in a negative direction and an increasingly negative output from filter F2. When the negatively increasing output from filter F2 exceeds the positive current $(y/R1)$, the net input current to amplifier A2 becomes negative, causing a positive output voltage from amplifier A2 and opening of switch ES–1. The negative net input current will be seen then to decrease as filter F2 discharges and eventually to become positive again, so that an amplifier A2 negative output will close switch ES–1 again to begin a new cycle. It will be seen that the closed-time of switch ES–1 will be directly proportional to the value of the $y$ input voltage. In order for the duty cycle to be substantially linearly proportional to the $y$ variable, filter F2 must have a very long time-constant, so that the capacitors of the filter are never charged more than 5 or 10 percent. However, in some applications it is unnecessary that the duty-cycle vary linearly with the $y$-variable. If the circuit of FIG. 1$a$ is used as modulator TM in FIG. 1, the effect of a non-linear duty cycle vs. input voltage characteristic caused by filter F2 may be exactly cancelled by use of a similar filter at F–1, if, in addition, the source resistance of function generator FG matches that of resistor R–2. The latter condition is unlikely, in most applications, but possible in certain special-purpose applications.

It will be seen that the time modulator of FIG. 1 is operative only when $y$ is a positive value, and that application of a negative input to resistor R–1 would result in switches S–1$a$ and S–1$b$ being permanently translated to one position. If operation with both polarities of $y$ is required, functions $f(x)$ and $-f(x)$ both may be generated, in the manner shown in FIG. 3, wherein blocks 60 and 61 each represent a diode function generator comprising a plurality of resistors and diodes of the type shown at FG in FIG. 1, with function generator 60 providing a current proportional to $+f(x)$ at terminal SJ and with function generator 61 providing a current proportional to $-f(x)$ at terminal $\overline{SJ}$. The input terminal of amplifier A1 is connected by means of electronic switches ES–1A and ES–1B alternately to terminals SJ and $\overline{SJ}$, with a duty-cycle commensurate with input voltage $y$. When $y$ is positive, switch ES–1A connects the circuit 60 output at SJ to amplifier A1 for a longer time than ES–1B applies the circuit 61 output, and when $y$ is negative switch ES–1B connects SJ to A1 longer than ES–1A connects SJ. When $y$ equals zero, both ES–1A and ES–1B are open and closed for equal times. The time-modulator shown in FIG. 3 corresponds to that of FIG. 1$a$, with amplifier A2 assumed to have an added output stage A3 so as to produce complementary output voltages $\overline{M}_1$ and $\overline{M}_1$. During one polarity of the A2 amplifier output, electronic switches ES–1A, ES–1B, ES–2A, ES–2B are closed in the pattern shown in FIG. 3, and during the other polarity of the A2 amplifier output each of the switches is transferred to a condition opposite from that shown. The complementary control voltages $M_1$ and $\overline{M}_1$ can also be used to drive similar switches for additional similar function generating circuits (not shown). It is not absolutely necessary that amplifier A3 be provided and that two separate lines carrying complementary switch-controlling signals be provided. All of the electronic switches can be controlled from the single amplifier A2 output if two of the switches are adapted to respond oppositely from the other two. Such an arrangement may be effected, for example, by using PNP transistors for two of the switches and NPN transistors for the other two switches. It is also desirable in the device of FIG. 3 that resistances R–2A and R–2B be less than resistance R–1 to insure a duty-cycle less than 100 percent during the maximum excursion of the $y$ input voltage.

It may be noted that if all of the input resistors and diodes of the function generator of FIG. 1 are eliminated, except for resistance R–S, or otherwise stated, if $f(x)$ in FIG. 1 is simply $x$, the output voltage from amplifier A1 will be $-yx$, so that the circuit comprises a two-quadrant multiplier. If switches S–3 and S–4 in FIG. 1 are closed to connect input voltages commensurate with other independent variables $r$ and $\phi$ to terminal SJ, it will be seen that the amplifier A1 output will be commensurate with $-y[f(x)+a_1r+a_2\phi]$, where $a_1$ and $a_2$ are scale factors determined by the sizes of resistances R–3 and R–4. If additional variables are to be summed with a function and then multiplied by a $y$ variable which may be either positive or negative, both polarities of the additional variable must be provided, with one polarity connected to summing junction SJ and the other connected to $\overline{SJ}$ in the manner exemplified by the $+r$ and $-r$ potentials applied through switch S–3 in FIG. 3. Thus it will be seen that the present invention provides a means for multiplying a unipolar voltage variable $y$ by a function $f(x)$, or for multiplying a bi-polar voltage variable $y$ by a function $f(x)$, with extremely simple and inexpensive circuitry in either case, and using an output amplifier which can simultaneously sum other input signals and can be even be used to integrate.

It will now become apparent, upon reflection, that simultaneous division by a further variable $z$ may be effected in either the arrangement of FIG. 1 or that of FIG. 3 by arranging a reference voltage to vary in accordance with the further variable. In FIG. 1 connection of a $-z$ voltage to resistor R-2 in lieu of the fixed $-V_R$ potential will provide such operation, and in FIG. 3 connection of $+z$ and $-z$ potentials to resistors R-2B and R-2A in lieu of the fixed $V_R$ potentials will provide such operation. Thus the modulator duty-cycles may be made to vary either in accordance with the value of a single variable input or in accordance with the ratio between two variable inputs.

Figure 1B:
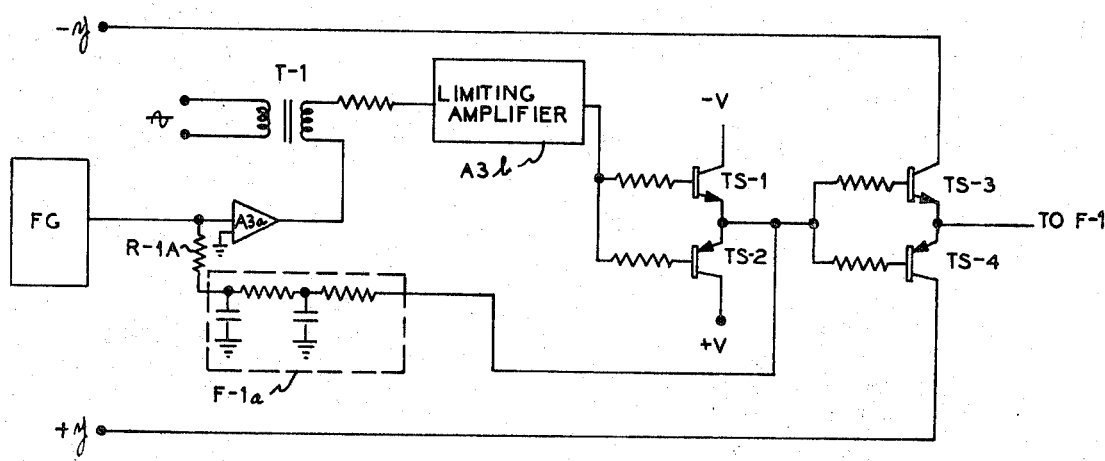

FIG. 1b illustrates a further form of pulse width modulator which may be used in lieu of modulator TM of FIG. 1 The circuit of FIG. 1b is an externally-excited fixed repetition rate modulator which follows principles set forth in detail in U.S. Pat No. 2,951,212, so only a brief description of its operation need be set forth herein. The diode function generator current which is to be time-modulated is derived by a function generator which may take the form of element FG of FIG. 1 and is applied from terminal SJ together with a feedback current through resistor R-1A to a high-gain DC amplifier A3A, and the output of amplifier A3A is applied to the secondary winding of transformer T-1. A periodic waveform such as a triangular wave or sine wave is induced in the secondary winding by connection of a suitable oscillator (not shown) to the transformer primary winding, and it will be seen that the ampliefier A3A output voltage raises the DC level of the periodic waveform upwardly or downwardly. A pair of summing resistors may be used to sum the periodic waveform and the amplifier A3A input into amplifier A3B in lieu of transformer T-1. Limiting amplifier A3B switches at each axis crossing from one to the other of its saturating output levels, thereby providing an output waveform to open and close transistor switches TS-1 and TS-2. The transistors are shown as opposite-conductivity types, so that a given level of the limiting amplifier output cuts off one transistor and turns on the other, and so that the two transistors form a single-pole double-throw switch. With zero output from amplifier A3A, and with equal and opposite constant voltages $+V$ and $-V$ applied to the transistor collectors, axis crossings will be seen to occur every 180 degrees of the periodic waveform, thereby alternating closing switches TS-1 and TS-2 for equal periods of time, but as the amplifier A3A output raises or lowers the DC level of the periodic waveform the axis crossings will occur at unequally-spaced intervals, thereby closing one switch for a longer period during one cycle of the periodic waveform than the other switch. The time-modulated output voltage on the interconnected emitter terminals is demodulated by filter F-1A to provide the feedback voltage applied to resistor R-1A, and also used to control one or more further SPDT transistor switches, such as that shown as comprising transistors TS-3 and TS-4. Plus and minus voltages commensurate with the $y$ variable are applied to the collectors of switches TS-3 and TS-4, and the output current from the interconnected emitters of switches TS-3 and TS-4 applied to filter F-1, and thence to amplifier A1 of FIG. 1 through an appropriately-sized input resistor. It may be noted that the time-modulator of FIG. 1b has the disadvantage that both polarities of the $y$ variable are required even if the $y$ variable does not change sign, but has the advantage that only a single function generator is required even if the $y$ variable does change sign, thereby sometimes offering significant economy over the circuit described in connection with FIG. 3. The time-modulator of FIG. 1b also has the advantageous feature that simultaneous division by a further variable may be accomplished merely by arranging the TS-1 and TS-2 collector voltages to vary in accordance with the further variable. The arrangement of FIG. 1b will be seen to differ from those of FIGS. 1 and 3 in that the generated non-linear function $f(x)$ is shown controlling the modulator duty-cycle in FIG. 1b and the $y$ multiplier variable is connected to be modulated, while the $y$ multiplier variable controls the modulator duty-cycles in FIGS. 1 and 3 and the non-linear function $f(x)$ is connected to be modulated. If the function $f(x)$ produced by circuit FG in FIG. 1 is assumed to be a linear function of $x$, or simply $x$, and if the $y$ input applied via R-1 is assumed to be a non-linear function $g(w)$, it will be seen that FIG. 1 comprises the same basic multiplying function generator arrangement as FIG. 1b, except for the details of the modulator circuit. It is important to recognize that in either FIG. 1 or FIG. 3, the $y$ input signal shown applied through resistor R-1 itself may comprise instead a current commensurate with a non-linear function $g(w)$, which may be derived by an additional function generator FG' similar to circuit FG of FIG. 1, so that the output in FIGS. 1 and 3 will comprise the product $-g(w)f(x)$. Translation of switch S-F in FIG. 1 to a position oposite from that shown in FIG. 1 is intended to represent such operation. In such an arrangement, the time-modulator TM may be connected to drive a plurality of further switches, to modulate further currents to provide further products, such as $-g(w)f_1(q)$, and $-g(w)f_2(x)$, etc. as is represented in FIG. 1 by sections $c$ and $d$ of switch S-1 and function generators FGC and FGD.

Figure 1C:
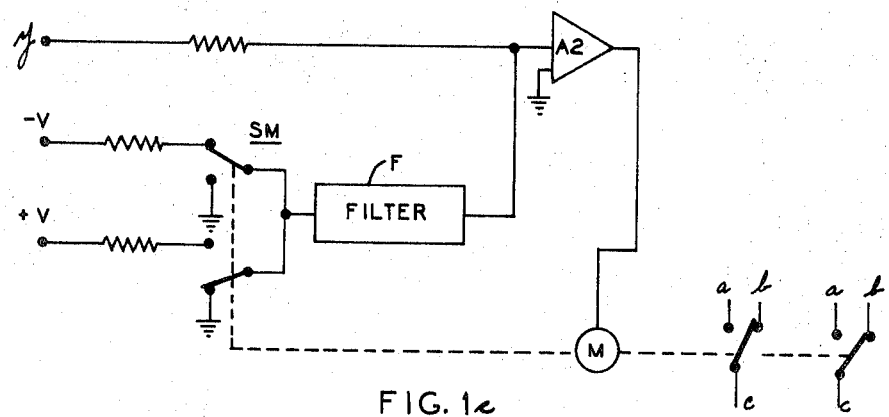

A simplified form of self-excited bi-polar time-modulator is shown in FIG. 1c, and its operation will be apparent from the previous descriptions of FIGS. 1, 1a and 1b. If opposite-polarity values of a variable are applied to the $a$ and $b$ terminals of the switches shown, it will be apparent that the output on the switch $c$ terminal will comprise a waveform having a time-average commensurate with the value of the variable multiplied by $y$. With both polarities of voltage V being alternately applied to filter F through DPDT switch SM, it will be appreciated that the $y$-variable input may take either positive or negative values. It will be apparent that a double-throw single-pole switch may be substituted for the double-pole double-throw switch shown.

Figure 1D:
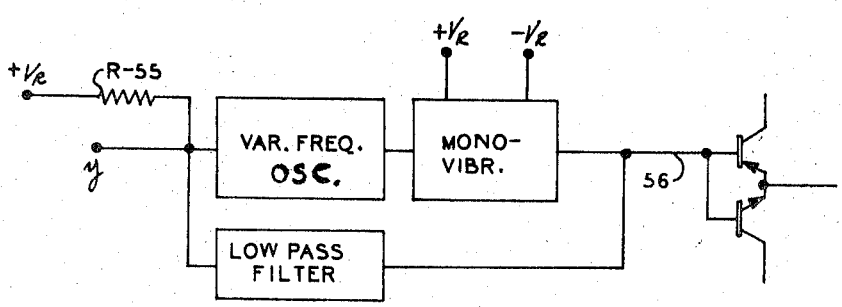

A further basic form of time-modulator is illustrated in block form in FIG. 1d. While the previously-described modulators operated either with a variable frequency and variable pulse width or with a fixed frequency and variable pulse width, the modulator of FIG. 1d operates with a variable frequency and fixed pulse width. The input signal commensurate with the $y$ variable controls the frequency of a variable frequency oscillator to increase the oscillator frequency as the applied input signal increases positively and to decrease the frequency as the input signal increases in a negative direction, and the output pulses from the oscillator are shaped into rectangular pulses of fixed width and amplitude by a mono-stable multivibrator. The output pulses from the monostable multivibrator are filtered to provide a feedback signal, and if the gain around the loop is made sufficiently great, the frequency or repetition rate of the output pulses on line 56 will be linearly related to the magnitude of the $y$ input signal. A bias is applied to the variable frequency oscillator through resistor R-55 to establish a center frequency which provides a 50 percent duty cycle for the output pulses. The output pulses of fixed width and variable frequency are applied to control one or more switches, such as the SPDT transistor switch shown in FIG. 1d. The different forms of time-modulator circuit may be interchanged among the various forms of the invention.

MULTI-VARIABLE FUNCTION GENERATION

My prior applications Ser. No. 651,932 filed June 12, 1967 and Ser. No. 678,411 filed Oct. 26, 1967 describe how a function $f(x, y)$ of two independent variables $x$ and $y$ can be generated using the known formula:

$$j(x,y) = f_0(x) + f y(x) y + \sum_{i=1}^{M} f_i(x) h_i(y) \quad (1)$$

where $h_i(y)$ are linear interpolating functions which are always positive. FIG. 4 illustrates an alternative means for generating a function of two variables using basic principles described above in connection with FIGS. 1 and 3 for implementing the above formula. The parallax or bias function $f_0(x)$ is provided by function generator FG–O, which may take the form, for example, of the circuit shown within dashed lines at FG in FIG. 1. The central-slop term $f_y(x)y$ in the formula is shown provided using the technique of FIG. 3, by modulating the outputs of $f_y(x)$ and $-f_y(x)$ function generators FG–YA and FG–YB by means of switches ESA and ESB, which are controlled by a $y$ input voltage in the same manner that switches ES–1A and ES–1B are controlled in FIG. 3, thereby to multiply the $f_y(x)$ term by $y$. The central-slope term alternatively could be generated using the technique of FIG. 1b, using a single $f_y(x)$ function generator to control a bi-polar time-modulator including switches connected to modulate + and $-y$ voltages: If operation throughout only a single polarity of $y$ is required, it will be appreciated that the simpler unipolar multiplying technique of FIG. 1 could be used instead, and that either FG–YA and ESA or FG–YB and ESB could be omitted.

In order to generate the terms of the formula under the summation sign, a plurality of M circuits of the type shown within dashed lines at IFG–1 are required, and only the first (IFG–1) and the last (IFG–M) are shown in FIG. 4. Each such circuit contains a function generator such as FG–1, which may take the form of FG of FIG. 1, to generate one of the $f_i(x)$ functions, and each such circuit contains a time-modulator, such as the type shown within IFG–1, to modulate and multiply a respective $f_i(x)$ quantity by a respective interpolating function $h_i(y)$. Each such time-modulator may be a unipolar type because all of the $h_i(y)$ interpolating functions are always positive. Amplifier AY1, filter FY1 and switch ES–1B may take the same form, for example, as amplifier A2, filter F and switch ES–1 of the time-modulator circuit shown in detail in FIG. 1a. Again the electronic modulator switches are shown as comprising simple mechanical switches for sake of simplicity. When the value of $y$ is less than the breakpoint value determined by the ratio between resistors R–51 and R–52, diode XY1 will be back-biased and provide no current to amplifier AY1, with the result that amplifier AY1 will hold switches ES–1A and ES–1B in positions opposite from those shown in FIG. 4, and no output current will be applied from FG–1 via switch ES–1A to summing junction SJ. When the value of $y$ increases sufficiently, however, diode XY1 will start to conduct, and as $y$ increases further the input current to amplifier AY1 will increase proportionally, thereby increasing the percentage of the duty-cycle during which switches ES–1A and ES–1B are closed to the positions shown in FIG. 4, and thereby multiplying the output $f_1(x)$ of FG–1 by the interpolating function $h_1(y)$ to provide one of the terms under the summation sign in the formula. The pairs of resistors in the further circuits (of the group IFG–1 to IFG–M) which are counterparts of resistors R–51 and R–52 of IFG–1 will have different resistance ratios, thereby establishing a plurality of different breakpoints at which their modulators become operative to apply their respective function generator output currents to terminal SJ. Thus it will be seen that the circuit of FIG. 4 implements the formula to provide the output voltage $-f(x, y)$. As in the previously-described circuits, additional inputs may be applied to amplifier A1, as is suggested by the $z$ potential applied via resistor R–55 in FIG. 4. Amplifier A1 may comprise an integrator, if desired, which will allow filter F–1 to be omitted, or a capacitor may be paralleled with resistor R–F, which also will allow filter F–1 to be omitted. While it may appear that a large number of modulator-circuits are required in order to generate a function having a large number of breakpoints in $y$, it should be kept in mind that numerous applications require generation of plural two-variable functions having a common variable $y$, frequently at the same breakpoints in $y$, so that the modulator circuit outputs (from AY, AY1 etc. in FIG. 4) may be used to control the switches of additional function generators, to generate functions such as $f_2(x, y)$ and $f(z, y)$, etc., with a considerable savings in equipment costs.

FIG. 4a shows a portion of FIG. 4 modified by insertion of a modulating switch S–1a and a further filter F–3 between terminal SJ and the summing junction of amplifier A1, with switch S–1a driven with a duty-cycle proportional to a third input variable $z$, by means of the time-modulation circuit comprising switch S–1b, filter F–2, amplifier A2 and M, which operates just as the time-modulator of FIG. 1a having correspondingly numbered parts operates. The unipolar time-modulator of FIG. 4a operates only for positive values of variable $z$. At this point it will be apparent that if two circuits of the type shown in FIG. 4 are provided, with one providing a $+f(x, y)$ current and the other a $-f(x, y)$ current, that a bi-polar time-modulator of the type shown in FIG. 3 may be used instead to connect the two currents to amplifier A1, so that $z$ may be allowed to take both positive and negative values. If a negative voltage is applied to terminal R in FIG. 4a, it will be seen that the circuit of FIG. 4a will provide the $zf(x, y)$ output only when the $z$ input exceeds a breakpoint determined by the ratio between resistors R–4a and R–4b and the magnitude of the negative voltage applied at terminal R. If zero voltage is applied to terminal R resistor R–4b obviously may be omitted and diode X–4a omitted.

FIG. 4b illustrates an alternative form of two-variable function generator which also implements expression (1) above, but which employs bi-polar time-division multiplication and thereby requires considerably fewer diode function generators than the apparatus of FIG. 4. In general, an arrangement of the nature shown in FIG. 4b will be preferred in applications where only one or relatively few functions of the same two independent variables are to be generated at given breakpoints; as the use of bi-polar time-modulators of the type shown in FIG. 1b enables one to halve the number of diode function generators when bi-polar multiplication is required. In FIG. 4b diode function generator FG–O provides the bias function current $f_0(x, y)$ in the same manner as in FIG. 4. Diode function generator FG–Y provides the central slope function $f_y(x)$ just as FG–YA does in FIG. 4, but rather than providing a second central slope function generator (FG–VB) to generate $-f_y(x)$ as in FIG. 4, the $+f_y(x)$ is applied to a bi-polar time-division modulator which is also supplied with both polarities of the $y$ variable. When the bi-polar time modulator of FIG. 1b, for example, is inserted at TDY–Y in FIG. 4b, the $f_y(x)$ output of diode function generator FG–Y is applied to the input terminal of amplifier A3A, the $+y$ and $-y$ voltages are connected to the TS–3 and TS–4 collectors just as in FIG. 1b, and the interconnected TS–3 and TS–4 emitter terminals are connected out to filter F–1. Similarly, each of the $m$ further function generators, only two of which are shown in FIG. 4b, generates a single $f_i(x)$ current which is supplied to a respective bi-polar time-division modulator which also receives a pair of opposite polarity inputs $+h_i$ and $-h_i$ corresponding to one of the $h_i$ interpolating functions. It will be seen that each positive interpolating function $+h_i$ is generated in the same manner as in FIG. 4, and that each negative interpolating function $-h_i$ is generated similarly but with opposite polarity voltages and an oppositely-poled diode. The time-modulators TDY–Y and TDM–1 to TDM–M each may comprise a bi-polar modulator of the type described in connection with FIG. 1b or an equivalent bi-polar type.

The output from filter F–1 also may be modulated in accordance with a third ($z$) variable before being terminated in amplifier A1, as illustrated in FIG. 4b if switch S–4a is assumed translated from the position shown, so that the outputs of function genrator FG–O and filter F–1 are further modulated in accordance with the $z$ variable before being applied to amplifier A1. Time-modulator TDM–Z is assumed to be the same bi-polar type as TDY–Y, and TDM–1 to TDM–M. It will be apparent at this point that a bi-polar modulator could be substituted for the unipolar modulator in FIG. 4a if both polarities of the $z$-variable input are available, and that a unipolar modulator could be substituted for TDM–Z in FIG. 4b if operation is restricted to only one polarity of the $z$ variable. If the $+z$ and $-z$ inputs to modulator TDM–Z are both applied to TDM–Z through biased diode circuits (in the manner shown for $+z$ only in FIG. 4a), it will be seen that multiplication by $z$ will occur at a selected breakpoint of the $z$ variables. Also, it should be recognized that the plus and minus $z$ inputs applied to modulator TDM–Z may comprise non-linear functions (e.g. $+f_z(z)$ and $-f_z(z)$) generated by a pair of circuits similar to FG of FIG. 1 thereby to provide $-f_z(z)f(x, y)$ at the output terminal of amplifier A1 in FIG. 4b. The arrangement of FIG. 4 using unipolar time-modulators is generally preferred over that of FIG. 4b for applications wherein a number of functions of the same pair of variables are to be generated at the same breakpoints, as it allows one to generate the additional functions without requiring additional modulator circuits, by merely providing additional passive diode function generator circuits.

By employing a plurality of two-input variable circuits followed by $z$-modulating switches one may multiply each of the two-variable circuit outputs $f_i(x, y)$ by further interpolating functions $g_i(z)$, and thereby generate a function $f(x, y, z)$ of three variables, by implementing the following formula:

$$f(x, y, z) = f_0(x, y) + f_z(x, y)z + \sum_{i=1}^{N} f_i(x, y)g_i(z) \tag{2}$$

Again, only a single terminating amplifier A1 is required, and as in the previous embodiments the terminating amplifier can also sum other inputs, and if desired, also be used for integration. One form of such a three-variable device is shown in FIG. 5. The N two-variable multiplying function generators XYZ1 through XYZN which compute the terms under the summation sign in expression (2) each may comprise a multiplying function generator of the type described in connection with FIG. 4a, with different ratios provided between the R–4a, R–4b resistor pairs in each function generator to determine the different $z$-variable breakpoints at which the different $g_i(z)$ interpolating functions are desired to be established. Alternatively, the N two-variable function generators XYZ1 through XYZN may comprise a two-variable function generator of the type shown in FIG. 4b, using a plurality of resistor pairs and diodes to establish the desired $z$-variable breakpoints. Bi-polar multiplication must be provided in each such function generator, of course, if the $z$ variable is to have both positive and negative values. Function generator FXY in FIG. 5 need not include multiplication by $z$, and hence can comprise a device such as that equipment shown to the left of terminal P in FIG. 4. Function generator ZXY in FIG. 5 may comprise a multplying function generator of the type shown in FIG. 4a with a constant voltage applied to its resistor R–4a and with its resistor R–4b and its diode X–4a omitted, or may comprise the device of FIG. 4b, with switch S–4a translated from the position shown.

It will now be apparent that extension of the invention to four or more independent variables may be made, by using a plurality of circuits of the type shown in FIG. 5, and modulating their outputs in accordance with interpolating functions of the fourth variable in similar manner, by insertion of either unipolar or bi-polar modulators at point L in each such circuit, still requiring only a single terminating amplifier.

TRIGONOMETRIC FUNCTION GENERATION AND MULTIPLICATION

In a number of applications, and particularly aircraft and missile flight and navigation control and simulation, it is necessary or desirable to compute trigonometric functions of an angle $\theta$ from angular rate ($\dot{\theta}$) input information, and the combined function generation and time-division multiplication technique of the present invention is applicable to such calculations, by implementation of the following mathematical identities:

$$\frac{d}{dt}\cos\theta = -\dot{\theta}\sin\theta \tag{3}$$

$$\frac{d}{dt}\sin\theta = \dot{\theta}\cos\theta \tag{4}$$

The basic aspects of such trigonometric resolution are discussed in my paper with Elmer G. Gilbert, "Trigonometric Resolution by Means of Multiplier Elements," Trans. IRE, PGEC, Vol. EC–6, No. 2, 1957. In FIG. 6 the input potential $\dot{\theta}$ is applied to a bi-polar time-modulation circuit of the type described in connection with FIG. 1c, which includes a low-pass filter F–2, amplifier means A5 and switching means (M and S1) controlled by the output waveform of amplifier A5. Switch portions $a$ and $b$ will be seen to provide bi-polar multiplication in the same manner as switches ES–1A and ES–1B of FIG. 3. If the potentials on terminals 61 and 62 are commensurate with $-\sin\theta$ and $+\sin\theta$, respectively, it will be understood that their modulation by portions $a$ and $b$ of switching means S1 to multiply them by $\dot{\theta}$ will result in an average input current to integrator amplifier A1 commensurate with $-\dot{\theta}\sin\theta$, so that an output potential commensurate with $-\cos\theta$ will be derived at integrator A1 output terminal 64, and so that inversion of that potential but unity gain inverting amplifier A2 will provide an output potential commensurate with $+\cos\theta$ on terminal 63. Similarly, if the potentials on terminals 63 and 64 are commensurate with $\cos\theta$ and $-\cos\theta$ respectively, it will be seen that multiplying them by modulating them with portions $c$ and $d$ of switching means S1 will result in an average input current to integrator amplifier A3 commensurate with $\dot{\theta}\cos\theta$, so that output potentials commensurate with $-\sin\theta$ and $+\sin\theta$ indeed will be obtained on terminals 61 and 62. Thus it will be seen that the circuit of FIG. 6 implicitly implements expressions (3) and (4) to provide the desired sine and cosine output potentials, using a very modest amount of relatively inexpensive circuitry. It may be noted that no low-pass filters are needed at the A1 and A3 input circuits because amplifiers A1 and A3 are integrators.

While the apparatus of FIG. 6 is useful for certain applications, it is possible for integrator drift and small switching and scaling errors accumulated over a period of time to cause error in the circuit of FIG. 6 so that the sine and cosine output potentials do not "agree," i.e., so that $\sin^2\theta + \cos^2\theta$ does not equal unity. Such problems are eliminated in the alternative rate resolver circuit of FIG. 7, which implements the following expressions:

$$\frac{d}{dt}\cos\theta = -\dot{\theta}\sin\theta + K(1-\cos^2\theta-\sin^2\theta)\cos\theta \tag{5}$$

$$\frac{d}{dt}\sin\theta = \dot{\theta}\cos\theta + K(1-\cos^2\theta-\sin^2\theta)\sin\theta \tag{6}$$

In expressions (5) and (6) the first terms on the right-hand side will be seen to express the ordinary identities, while the last term in each expression is an error correction term. In the rate resolver of FIG. 7 the $-\dot{\theta}\sin\theta$ input to amplifier A1 is obtained by multiplying the $-\theta$ and $+\theta$ input potentials by $\sin\theta$, and the $\dot{\theta}\cos\theta$ input to amplifier A3 is obtained by multiplying the rate input potentials by $\cos\theta$. Thus switching means SMS is provided with a duty-cycle commensurate with $\sin\theta$ and switching means SMC with a duty-cycle commensurate with cos $\theta$.

Recognizing that $\sin^2 \theta + \cos^2 \theta$ equals unity, it will be apparent that the last terms in each of expressions (5) and (6) will be zero in any system where the sine and cosine values "agree," but not zero if the sum of the squares of the computed sine and cosine quantities do not add up to unity. In the circuit of FIG. 7 the $+\cos \theta$ and $+\sin \theta$ output potentials from amplifiers A1 to A4 are each applied to a respective diode squaring circuit SLC, SLS, respectively, to provide $-\cos^2 \theta$ and $-\sin^2 \theta$ output signals which are summed at amplifier A5 with a constant current representing unity applied through resistor R–74. If the quantity $(1-\cos^2 \theta - \sin^2 \theta)$ does not equal zero, thereby indicating that the circuit is unbalanced, it will be seen that error-correction potentials commensurate with $-KE$ and $+KE$ will be derived from amplifiers A5 and A6, where E represents $(1-\cos^2 \theta -\sin^2 \theta)$, or the error. The KE error correction potential is multiplied by $\cos \theta$ by modulating both polarities of it by means of portions $a$ and $b$ of switching means SMC, thereby to apply a modulated current $KE \cos \theta$ commensurate with the last term of expression (5) to amplifier-integrator A1. The KE error correction potential is also multiplied by $\sin \theta$ by portions $c$ and $d$ of switching means SMS to apply a $KE \sin \theta$ potential to amplifier-integrator A3, commensurate with the last term of expression (6). With the feedback connections shown it will be appreciated that the circuit of FIG. 7 will automatically adjust itself so as to reduce the error quantity E to zero. The speed with which such error-correction occurs, or the "tightness" of the error-correction loop, will be seen to depend upon the overall gains of amplifiers A5 and A6 and the sizes of the resistors R–3C, R–3D, R–4A and R–4B. The arrangement of FIG. 7 may be modified to eliminate diode squaring circuits SLC and SLS by modulating the $+\cos \theta$ and $-\cos \theta$ outputs of amplifiers A1 and A2 by a further SPDT switch section (not shown) on switching means SMC, and by modulating the $+\sin \theta$ and $-\sin \theta$ outputs of amplifiers A3 and A4 by a further SPDT switch section (not shown) on switching means SMS, and applying the outputs from the two further switch sections to amplifier A5, which then would include a low-pass filter.

While time-modulation is done in accordance with the trigonometric functions in FIG. 7 where amplitude stabilization is incorporated, rather than in accordance with the angular rate input quantity as in FIG. 6, the multiplying scheme of FIG. 6 is quite as susceptible to the error-correction scheme, and the additional apparatus required to be added to FIG. 6 to implement Equations 5 and 6 in full is shown in FIG. 6A, wherein the terminals connect to correspondingly-numbered terminals of FIG. 6. The $K(1-\cos^2 \theta -\sin^2 \theta)$ or KE signal from amplifier A6 is shown applied to control a time-modulator circuit to provide switch S2 with a duty-cycle commensurate with KE. Sections $a$ and $b$ of switch S2 modulate $+$ and $-$cosine $\theta$ potentials to provide an average current proportional to the last term in Equation 5 to the summing junction terminal 65 of amplifier A1, and sections $c$ and $d$ of switch S2 modulate $+$ and $-$sine $\theta$ potentials to provide an average current proportional to the last term in Equation 6 to the summing junction terminal 66 of amplifier A3. It will be apparent that amplifier A6 could be eliminated in FIG. 6a, if desired.

SYNCHRO DRIVER APPLICATIONS

In FIG. 8 a conventional pair of synchros or "selsyns" are shown, with the rotors of each connected to be excited by line voltage $A \sin \omega_0$ where $\omega_0$ is the carrier frequency, such as 60 or 400 c.p.s. As is well known, the voltage $e_1$, $e_2$ and $e_3$ induced in each of the transmitter T stator windings will be as follows:

$$e_1 = V \cos (\theta - \pi/3) \sin \omega_0 t = V(0.5 \cos \theta + 0.866 \sin \alpha) \sin \omega_0 t \quad (7)$$

$$e_2 = V \cos \theta \sin \omega_0 t \quad (8)$$

$$e_3 = V \cos (\theta - 4\pi/3) \sin \omega_0 t = V(-0.5 \cos \theta - 0.866 \sin \alpha) \sin \omega_0 t \quad (9)$$

where $\theta$ is the angle between the rotor flux direction and the flux direction of coil $L_2$ of the transmitter stator. By combining expressions (7) and (8) it will be seen that the voltage $E_1$ across one pair of receiver windings will equal:

$$E_1 = e_1 - e_2 = (-1.5 \cos \theta + 0.866 \sin \theta) \sin \omega_0 t \quad (10)$$

and that the voltage $E_2$ across another pair of receiver windings will equal:

$$E_2 = e_3 - e_2 = (-1.5 \cos \theta - 0.866 \sin \theta) \sin \omega_0 t \quad (11)$$

If voltages with respect to ground can be generated electrically in accordance with expressions (10) and (11) and if one terminal of the receiver is grounded, the synchro receiver will be seen to receive the same voltage across its stator as synchro transmitter T provides for a transmitter rotor angle $\theta$. Apparatus for generating such $E_1$ and $E_2$ signals is shown in FIG. 9. The sin/cos function generator may comprise any known means for deriving plus and minus sine and cosine direct potentials, and may comprise the circuit of FIG. 6, for example, preferably also including the stabilization circuitry of FIG. 6A, or may comprise the circuit of FIG. 7, as another example. The four output potentials from the sin/cos function generator are applied through four resistors 91–94 to the terminals of switches ES–1 and ES–2, which are switched back and forth at the carrier frequency $\omega_0$, thereby providing square wave outputs from both switches Though shown as simple relay-operated mechanical switches, the switches actually will be electronic switches, of course, in most embodiments of the invention. The upper terminals of switches ES–1 and ES–2 will be seen to provide a current commensurate with the quantity within brackets in expression (10); and the lower terminals of the switches to provide an equal current which is opposite in sign. Filter network F–91 in the feed-back circuit of amplifier A–91 removes the higher harmonics from the modulated square waves, thereby providing an $E_1$ output voltage which (except for any unfiltered harmonics) is commensurate with expression (10). The similar operation of resistors 95–98, switches ES–3 and ES–4, amplifier A–92 and filter F–92 to provide an $E_2$ voltage commensurate with expression (11) will now be apparent without explanation. The carrier frequency signal is shown connected to excite the synchro receiver rotor winding as well as driving switches ES–1 through ES–4. Thus it will be seen that the receiver rotor may be positioned to the angle $\theta$ by an all-electronic circuit utilizing techniques of the present invention, beginning with a $\theta$ electrical input to an all-electronic function generator if the sin/cos generator of FIG. 6 or FIG. 7 is used, with very simple, inexpensive and reliable circuitry.

The $E_1$ and $E_2$ output voltages are useful not only for driving synchro receivers, but for driving a variety of other similar devices. In FIG. 9 the voltages are also shown applied to a conventional differential synchro DS, which also receives a shaft input commensurate with an angle $\phi$, and the differential synchro output is connected to position a further synchro receiver FR to the angle $\theta - \phi$.

As switches ES–1 through ES–4 are connected to amplifier summing junctions in FIG. 9, and hence always have one side at ground potential, it will be seen that they operate as current switches. It will be seen that higher harmonic rejection filters (i.e. low-pass filters) may be used in series with the amplifier inputs in lieu of using high-pass filters in the amplifier feedback networks as shown in FIG. 9. In fact, in applications where the synchro receiver is less sensitive to harmonics and the receiver windings have higher enough impedance, the circuit of FIG. 9 may be simplified even further by eliminating amplifiers A91 and A92, as shown in FIG. 9a, wherein parts similar to those of FIG. 9 are given corresponding reference characters, and wherein current switches ES–1 and ES–4 have been replaced by voltage switches VS–1 to VS–4. The operation of the circuit of FIG. 9a will be apparent at this point without further explanation. It will be apparent that the number of resistors used in FIGS. 9 and 9a may be halved if the resistors are connected in each case on the other side of the switches shown, although it will be recognized that the switches in FIG. 9 then would require higher voltage ratings.

In a further alternative embodiment of the invention illustrated in FIG. 9b, switches VS–1 through VS–4 are not merely opened and closed at the synchro receiver rotor frequency ω, but instead controlled by externally-excited time-modulator TM–90 which is excited by a higher carrier frequency signal for oscillator 91, for example, to provide pulses at a 6 kilohertz rate, for example, with the width of the pulses being controlled by the same 60-cycle sinusoidal source which excites the receiver rotor. Thus a pulse occurring when the 60–cycle sine wave is near a maximum amplitude value (90 or 270 degrees of the 60-cycle sine wave) may have a time width approaching 167 microseconds (the duration of one 6 kilohertz period) and pulses occuring bear the zero and 180-degree points of the 60-cycle signal will have minimum or zero time-width. The amplitudes of the pulses are properly proportioned between the various switch terminals in the same manner as in FIGS. 9 and 9a, by the resistance relationships between resistors 91–98.

A wide variety of different types of electronic switches may be used in practicing the invention, and a number of different types of time modulators or pulse width modulators, whether they be of the fixed repetition rate-variable pulse width type, the variable reeptition rate-fixed pulse width type, or the variable rate-variable width type. Each of the time-modulators is illustrated as connecting one or more switches alternately between one or the other of a pair of terminals. It is possible to construct time modulators having a third "open" or intermediate position, and time modulators of that type may be used in practicing the invention, though with no apparent advantage over the systems shown, and with a disadvantage of less gain and hence less accuracy.

It will thus be seen that the objects set forth above, among those made apparent from the preceding descriptions, are efficiently attained, and since certain changes may be made in the above constructions without departing from the scope of the invention, it is intended that all matter contained in the above descriptions or shown in the accompanying drawings shall be interpreted as illustrative and not in a limiting sense.

The embodiments of the invention in which an exclusive property or privilege is claimed are defined as follows:

1. Multiplying function generating apparatus for providing an output potential commensurate with the product of a first variable multiplied by an arbitrary function of a second variable, comprising in combination: a first input terminal connected to receive a first input potential commensurate with the value of said second variable; a second input terminal connected to receive a first reference potential; a first pair of resistances, said pair of resistances being connected in series between said first and second input terminals; a summing junction terminal; a unidirectional conducting means, said unidirectional conducting means being connected between said summing junction terminal and the junction between said pair of said resistances; amplifying and filtering means having an input third terminal and an output terminal; switching means for connecting and disconnecting said summing juction terminal to and from said third input terminal; and time-modulating means responsive to the value of said first variable for controlling said switching means, thereby to provide said output potential at said output terminal.

2. Apparatus according to claim 1 having a further pair of resistances; a fourth input terminal connected to receive a third input potential opposite in polarity to said first input potential; and a further unidirectional conducting means, said further pair of resistances being connected in series between said second and fourth input terminals and said further unidirectional conducting means being connected between said summing junction terminal and the junction between said resistances of said further pair.

3. Apparatus according to claim 1 having a further pair of resistances; a fourth input terminal connected to receive a second reference potential opposite in polarity to said first reference potential; and a further unidirectional conducting means, said further pair of resistances being connected in series between said first and fourth input terminals and said further unidirectional conducting means being connected between said summing junction terminal and the junction between said resistances of said further pair.

4 Apparatus according to claim 1 having a second pair of resistances; a fourth input terminal connected to receive a third input potential opposite in polarity to said first input potential; a second unidirectional conducting means, said second pair of resistances being connected in series between said second and fourth input terminals and said second unidirectional conducting means being connected between said summing junction terminal and the junction between said second pair of resistances; a third pair of resistances; a fifth input terminal connected to receive a second reference potential opposite in polarity to said first reference potential; and a third unidirectional conducting means, said third pair of resistances being connected in series between said first and fifth input terminals and said third unidirectional conducting means being connected between said summing junction terminal and the junction between said third pair of resistances.

5. Apparatus according to claim 1 having a further resistance connected between said second input terminal and said summing junction terminal.

6. Apparatus according to claim 1 having a further resistance connected between said first input terminal and said summing junction terminal.

7. Apparatus according to claim 1 in which said time-modulating means is operative to repetitively connect said summing junction terminal to said third input terminal at a varying repetition rate and for varying lengths of time in accordance with a duty cycle commensurate with the value of said first variable.

8. Apparatus according to claim 1 in which said time-modulating means is operative to repetitively connect said summing junction terminal to said third input terminal at a fixed repetition rate and for varying lengths of time in accordance with a duty cycle commensurate with the value of said first variable.

9. Apparatus according to claim 1 in which said time-modulating means is operative to repetitively connect said summing junction terminal to said third input terminal at a varying repetition rate for fixed lengths of time in accordance with a duty cycle commensurate with the value of said first variable.

10. Apparatus according to claim 1 in which said amplifying and filtering means comprises a direct-coupled amplifier having an input terminal, and a low-pass filter means connected between said third input terminal and said input terminal of said direct-coupled amplifier.

11. Apparatus according to claim 1 in which said amplifying and filtering means comprises a direct-coupled amplifier means having input and output terminals and high-pass filter means connected between said input and output terminals of said amplifier means, said input terminal of said amplifier means being connected to said third input terminal.

12. Apparatus according to claim 1 including further function generator means responsive to a further input signal commensurate with the value of a further variable for providing a current commensurate with a desired function of said further variable at a further terminal; and further switching means controlled by said time-modulating means for connecting and disconnecting said further terminal to and from said third input terminal.

13. Apparatus according to claim 1 including further function generator means responsive to a further input signal commensurate with the value of a third variable for providing a current commensurate with a desired function of said third variable; further time-modulating means operative to modulate said current in accordance with the value of a fourth variable to provide a further waveform signal; and circuit means connecting said further waveform signal to said third input terminal.

14. Apparatus according to claim 1 having a further resistance connected to said summing junction terminal; and means for applying a current commensurate with the value of a further variable through said further resistance to said summing junction terminal.

15. Apparatus according to claim 1 having a further resistance connected to said amplifying and filtering means; and means for applying a current commensurate with the value of a further variable through said further resistance to said amplifying and filtering means.

16. Apparatus according to claim 4 having a fourth pair of resistances, said fourth pair of resistances being connected in series between said fourth input terminal and said fifth input terminal; and a fourth unidirectional conducting means, said fourth unidirectional conducting means being connected between said summing junction terminal and the junction between said resistances of said fourth pair.

17. Multiplying function generating apparatus for providing an output potential commensurate with the product of a first variable multiplied by an arbitrary function of a second variable, comprising, in combination: a first function generator responsive to a first input potential commensurate with the value of said second variable and responsive to a first reference potential and operative to provide a first output current commensurate with said arbitrary function of said second variable; first amplifying and filtering means having an input terminal and an output terminal; switching means for connecting and disconnecting said first output current to and from said input terminal; and time-modulating means responsive to the value of said first variable for controlling the duty cycle of said switching means, thereby to provide said output potential at said output terminal.

18. Apparatus according to claim 17 in which said time-modulating means is also responsive to the value of a third variable and operable to control said switching means with a duty cycle commensurate with the ratio between said first and third variables.

19. Apparatus according to claim 17 having a second amplifying and filtering means; a second function generator operable to provide a second output current; and further switching means for connecting and disconnecting said second output current to and from said second amplifying and filtering means, said further switching means being connected to be controlled by said time-modulating means.

20. Apparatus according to claim 19 in which said second function generator is responsive to said first input potential and said second output current varies as a second arbitrary function of said second variable.

21. Apparatus according to claim 19 in which said second function generator is responsive to a further potential commensurate with the value of a further variable.

22. Multiplying function generating apparatus for providing an output potential commensurate with the product of a first variable multiplied by an arbitrary function of a second variable, comprising, in combination: first and second function generators responsive to input potentials commensurate with the value of said second variable and operative to provide first and second currents at first and second terminals, said first and second currents being of opposite polarity and each commensurate in magnitude with the value of said function of said second variable; amplifying and filtering means having an input third terminal and an output terminal; switching means for connecting said first and second terminals alternately to said input third terminal; and time-modulating means responsive to the value of said first variable for controlling said switching means, thereby to provide said output potential at said output terminal.

23. Apparatus according to claim 22 including first resistance means connected to said first terminal and second resistance means connected to said second terminal; and means for applying a pair of opposite-polarity potentials commensurate with the value of a further variable respectively to said first and second resistance means.

24. Multiplying function generating apparatus for providing an output potential commensurate with the product of a first variable multiplied by an arbitrary function of a second variable, comprising, in combination: a function generator responsive to an input potential commensurate with the value of said second variable and operative to provide an output current at a first termnial commensurate with the value of said function of said second variable; amplifying and filtering means having an input third terminal and an output terminal; means for providing first and second potentials of opposite polarity each commensurate in magnitude with the value of said first variable; switching means for connecting said first and second potentials alternately to said input third terminal; and time-modulating means controlled by said output current of said function generator for controlling said switching means, thereby to provide said output potential at said output terminal.

25. Apparatus for generating an output potential commensurate with a desired function of first and second independent variables, comprising, in combination: a plurality of function generators responsive to input potentials commensurate with the value of said first variable for providing respective output currents each commensurate with the value of said desired function at different values of said second variable; a plurality of switching means each connected to modulate a respective one of said output currents to provide a respective modulated signal; amplifying and filtering means connected to receive each of said modulated signals and to provide said output potential; a plurality of time-modulating means for controlling respective ones of said switching means; and a plurality of resistor-diode circuits connected to control respective ones of said time-modulating means, each of said resistor-diode circuits being responsive to an input potential commensurate with the value of said second variable and biased to cause its associated time-modulating means to operate its associated switching means over a different range of values of said second variable.

26. Apparatus according to claim 25 including a further function generator responsive to an input potential commensurate with the value of said first variable for providing a further output current; a further switching means connected to modulate said further output current to provide a further modulated signal; a further time-modulating means responsive to said input potential commensurate with the value of said second variable for controlling said further switching means; and circuit means for applying said further modulated signal to said amplifying and filtering means.

27. Apparatus according to claim 25 including a further function generator responsive to an input potential commensurate with the value of said first variable for providing a further output current commensurate with the value of said desired function at a reference value of said second variable; and circuit means for applying said further output current to said amplifying and filtering means.

28. Apparatus according to claim 25 in which said amplifying and filtering means comprises low-pass filter means connected to receive said modulated signals and to provide a further output signal, further modulating and switching means for modulating said further output signal in accordance with the value of a third variable to provide a third modulated signal; and amplifying and filtering means responsive to said third modulated signal for providing an output potential commensurate with said desired function of said first and second variables multiplied by said third variable.

29. Apparatus according to claim 25 in which each of said function generators is operative to provide a respective pair of output currents of opposite polarity and in which the switching means associated with each function generator is operative to connect the opposite-polarity output currents of the pair alternately to said amplifying and filtering means.

30. Apparatus according to claim 28 including means responsive to a potential commensurate with said third variable for limiting the range of said third variable over which said further modulating and switching means is operative to provide said third modulated signal.

31. Apparatus for generating an output potential commensurate with a desired function of first and second independent variables, comprising, in combination: a plurality of function generators responsive to input potentials commensurate with the value of said first variable for providing respective output currents each commensurate with the value of said desired function at different values of said second variable; a plurality of resistor-diode circuits each responsive to input potentials commensurate with the value of said second variable for providing a respective pair of interpolating potentials of equal magnitude and opposite polarity at respective breakpoint values of said second variable; amplifying and filtering means having an input terminal and an output terminal; a plurality of switching means each operative to connect a respective pair of said interpolating potentials alternately to said input terminal of said amplifying and filtering means; and a plurality of time-modulating means for controlling the operation of said switching means, each of said time-modulating means being connected to be controlled by the output current of a respective one of said function generators.

32. Apparatus according to claim 31 including a further function generator responsive to said input potentials commensurate with the value of said first variable for providing a further output current; further switching means connected to a pair of opposite polarity input potentials commensurate with the value of said second variable; and time-modulating means controlled by said further output current for operating said further switching means to connect said opposite-polarity input potentials alternately to the input terminal of said amplifying and filtering means.

33. Apparatus according to claim 31 including a further function generator responsive to an input potential commensurate with the value of said first variable for providing a further output current commensurate with the value of said desired function at a reference value of said second variable; and circuit means for applying said further output current to said amplifying and filtering means.

34. Apparatus according to claim 31, in which said amplifying and filtering means includes low-pass filter means connected to said input terminal; a further time-modulating means connected to be controlled by an output signal from said low-pass filter means; further, switching means connected to a pair of opposite-polarity potentials each commensurate in magnitude with the value of a third variable; and further filter and amplifier means, said time-modulating means being connected to control said further switching means to connect said pair of opposite-polarity third-variable potentials alternately to the input circuit of said further filter and amplifier means, thereby to provide an output potential at the output terminal of said amplifying and filtering means commensurate with desired function of said first and second variables multiplied by said third variable.

35. Apparatus for generating an output potential commensurate with a function of three independent variables, comprising, in combination: a plurality of two-variable multiplying function generators; and amplifying means having input and output terminals, each of said multiplying two-variable function generators being connected to apply an output signal to said input terminal of said amplying means, each of said multiplying two-variable function generators comprising first means for providing a current commensurate with a respective function of the first and second of said three variables and means for time-modulating said current in accordance with the difference between the value of said third variable and a respective breakpoint value of said third variable.

36. Apparatus according to claim 35 in which at least one of said first means comprises a plurality of single-variable function generators for providing respective output currents commensurate with different functions of said first variable, and means for time-modulating each of said output currents in accordance with the difference between the instantaneous value of said second variable and a respective breakpoint value of said second variable.

37. Apparatus according to claim 35 in which at least one of said first means comprises a plurality of single-variable function generators for providing respective output currents commensurate with different functions of said first variable; means for providing a plurality of interpolating potentials each commensurate with the difference between the instantaneous value of said second variable and a respective breakpoint value of said second variable; and a plurality of time-modulating means controlled by respective of said output currents for modulating respective ones of said interpolating potentials.

38. Apparatus for generating output potentials commensurate with sine and cosine functions of an angle $\theta$ in response to an input signal $\dot{\theta}$ commensurate with the time-rate of change of said angle, comprising, in combination: first and second integrating means each having an input terminal and having respective first and second output terminals; first and second potential inverting means connected to invert the potentials at the output terminals of said first and second integrating means, respectively to provide inverted output potentials at third and fourth terminals, respectively; switching means for connecting said first and third terminals, alternately to the input terminal of said second integrating means and for connecting said second and fourth terminals alternately to the input terminal of said first integrating means; and modulator means responsive to said input signal for controlling said switching means to provide a switching duty cycle commensurate with said time-rate of change of said angle.

39. Apparatus according to claim 38 including first and second squaring means responsive to the output signals from said first and second integrating means, respectively, and to the inverted output signals from said first and second potential-inverting means, respectively, and operative to provide third and fourth signals; means for combining said third and fourth signal and a constant potential to provide an error correction potential; second switching means for applying signals from said first and third terminals alternately to the input terminal of said first integrating means and for applying signals from said second and fourth terminals alternately to the input terminal of said first integrating means; and second modulator means responsive to said error correction potential for controlling the duty cycle of said second switching means.

40. Apparatus according to claim 39 in which at least one of said squaring means comprises a diode squaring circuit.

41. Apparatus according to claim 39 in which at least one of said squaring means comprises filter means and further switching means for applying the output potentials from said first and third output terminals alternately to said filter means, said further switching means being controlled by said second modulator means.

42. Apparatus according to claim 38 including second switching means having four pairs of switch input terminals; a first pair of resistances connected between said first and third terminals and the first pair of switch input terminals; a second pair of resistances connected between said second and fourth terminals and the second pair of switch input terminals; a third pair of resistances connected between said first and third terminals and the third pair of switch input terminals; a fourth pair of resistances connected between said second and fourth terminals and the fourth pair of switch input terminals; first and second filtering and amplifying means each having input and output circuits; said second switching means being operative to connect the two switch input terminals of the first and second pairs alternately to the input circuit of said first filtering and amplifying means, and operative to connect the two switch input terminals of the third and fourth pairs alternately to the input circuit of said second filtering and amplifying means; and means for translating said second switching means.

43. Apparatus for generating output potentials commensurate with sine and cosine functions of an angle $\theta$ in response to a pair of first and second input signals $+\dot\theta$ and $-\dot\theta$ commensurate with the time-rate of change of said angle, comprising, in combination: first and second integrating means each having an input terminal and having first and second output terminals, respectively; first and second potential-inverting means connected to invert the potentials at the output terminals of said first and second integrating means, respectively, to provide output potentials at third and fourth terminals, respectively; first switching means for connecting said first and second input signals alternately to the input terminal of said first integrating means; first modulator means responsive to the output potential at said fourth terminal for controlling the duty cycle of said first switching means; second switching means for connecting said first and second input signals alternately to the input terminal of said second integrating means; and second modulator means responsive to the output signal at said third terminal for controlling the duty cycle of said second switching means.

44. Apparatus according to claim 43 including first and second squaring circuits responsive to the output signals from said first and second integrating means respectively, and operative to provide third and fourth signals; means for combining said third and fourth signals and a constant potential to provide first and second error correction potential, said first switching means including means for alternately applying said error correction potentials to the input terminal of said second integrating means, and said second switching means including means for alternately applying said correction potentials to the input terminal of said first integrating means.

45. Apparatus according to claim 1 having a second pair of resistances connected in series between said first and second input terminals and a second unidirectional conducting means connected between said summing junction terminal and the junction between said resistances of said second pair, the resistance ratio between said first pair of resistances being different than the resistance ratio between said second pair of resistances.

References Cited

UNITED STATES PATENTS

| 3,028,504 | 4/1962 | Close | 235—189 X |
| 3,087,674 | 4/1963 | Cunningham et al. | 235—197 |
| 3,226,641 | 12/1963 | Miller. | |
| 3,253,135 | 5/1966 | Collings et al. | 235—197 X |
| 3,308,287 | 3/1967 | Levy et al. | 235—197 X |
| 3,358,130 | 12/1967 | Miura et al. | 235—197 |
| 3,376,570 | 4/1968 | Lawson | 235—197 X |

EUGENE G. BOTZ, Primary Examiner

J. F. RUGGIERO, Assistant Examiner

U.S. Cl. X.R.

235—197